US012606420B2

(12) United States Patent
Yuksel et al.

(10) Patent No.: US 12,606,420 B2
(45) Date of Patent: Apr. 21, 2026

(54) SEAT SYSTEMS FOR MOVING WALKWAYS

(71) Applicant: Beltways Inc., Cincinnati, OH (US)

(72) Inventors: Edip Yuksel, Cincinnati, OH (US); Matine Yuksel, Cincinnati, OH (US); Yahya John Yuksel, Cincinnati, OH (US)

(73) Assignee: Beltways Inc., Cincinnati, OH (US)

( * ) Notice: Subject to any disclaimer, the term of this patent is extended or adjusted under 35 U.S.C. 154(b) by 104 days.

(21) Appl. No.: 18/618,642

(22) Filed: Mar. 27, 2024

(65) Prior Publication Data

US 2024/0327169 A1 Oct. 3, 2024

Related U.S. Application Data

(63) Continuation of application No. 18/615,419, filed on Mar. 25, 2024.

(60) Provisional application No. 63/454,754, filed on Mar. 27, 2023.

(51) Int. Cl.
*B66B 23/24* (2006.01)
*B66B 21/10* (2006.01)
*B66B 23/04* (2006.01)
*B66B 25/00* (2006.01)

(52) U.S. Cl.
CPC .............. *B66B 23/24* (2013.01); *B66B 21/10* (2013.01); *B66B 23/04* (2013.01); *B66B 25/00* (2013.01)

(58) Field of Classification Search
None
See application file for complete search history.

(56) References Cited

U.S. PATENT DOCUMENTS 4,232,776 A * 11/1980 Dean ........................ B66B 23/26 198/791
6,574,530 B1 * 6/2003 Bertone .................. B66B 21/10 198/321
6,602,331 B2 * 8/2003 Gonzalez Alemany ..................... B66B 23/26 96/66
6,712,192 B1 * 3/2004 Hester ................... B66B 9/0846 198/321
2010/0089718 A1 * 4/2010 Gonzalez Alemany ..................... B66B 23/04 198/334
2010/0162916 A1 * 7/2010 Lechner .................. B66B 21/12 104/20
2011/0083938 A1 * 4/2011 Illedits .................... B66B 23/24 198/337
2015/0068847 A1 * 3/2015 Ooms ..................... H04W 8/22 187/201

(Continued)

FOREIGN PATENT DOCUMENTS

CN 206634906 U * 11/2017
CN 110902544 A * 3/2020 ............. B66B 23/02

(Continued)

*Primary Examiner* — Gene O Crawford
*Assistant Examiner* — Muhammad Awais
(74) *Attorney, Agent, or Firm* — Hall Estill Law Firm

(57) ABSTRACT

A seat system for a moving walkway. The seat system includes multiple seat apparatuses for a moving walkway wherein each seat apparatus includes a seat. The seat system also includes a propulsion system for propelling the seat apparatuses on a passenger side and a return side of a loop track the seat apparatuses travel around. The seat system further includes a frame for supporting the seat system and enclosing the return side for the seats.

28 Claims, 10 Drawing Sheets

(56) References Cited

U.S. PATENT DOCUMENTS

| | | | | |
|---|---|---|---|---|
| 2020/0165103 | A1* | 5/2020 | Titchener | B66B 9/08 |
| 2021/0039502 | A1* | 2/2021 | Clark | B60L 13/03 |
| 2022/0212898 | A1* | 7/2022 | Yuksel | B66B 27/00 |

FOREIGN PATENT DOCUMENTS

| | | | | |
|---|---|---|---|---|
| DE | 102006038905 | B3 * | 12/2007 | B66B 21/00 |
| JP | 4407227 | B2 * | 2/2010 | |

* cited by examiner

SEAT SYSTEMS FOR MOVING WALKWAYS

STATEMENT REGARDING FEDERALLY SPONSORED RESEARCH OR DEVELOPMENT

Not applicable.

CROSS-REFERENCE TO RELATED APPLICATIONS

The present application is a conversion of U.S. Provisional Application having U.S. Ser. No. 63/454,754, filed Mar. 27, 2023, and a continuation of U.S. Patent Application having U.S. Ser. No. 18/615,419, filed Mar. 25, 2024, which claims the benefit under 35 U.S.C. 119(e). The disclosures of which are hereby expressly incorporated herein by reference.

BACKGROUND OF THE DISCLOSURE

1. Field of the Invention

The present disclosure relates to seat systems for use with a moving walkway.

2. Description of the Related Art

Some moving walkways can be designed to cover long distances. There are certain members of our society that walking long distances or standing for long durations are difficult for them. To date, moving walkways have only been designed for a person to walk or stand on them. No ability for a person to sit as they ride the moving walkway has been developed.

Accordingly, there is a need for a moving walkway that provides a seat system so that people riding a moving walkway can have the option to do so in a seated position.

SUMMARY OF THE DISCLOSURE

The present disclosure is directed to a seat system for a moving walkway. The seat system includes multiple seat apparatuses for a moving walkway wherein each seat apparatus includes a seat. The seat system also includes a propulsion system for propelling the seat apparatuses on a passenger side and a return side of a loop track the seat apparatuses travel around. The seat system further includes a frame for supporting the seat system and enclosing the return side for the seats.

DETAILED DESCRIPTION OF THE DISCLOSURE

Figure 1A:
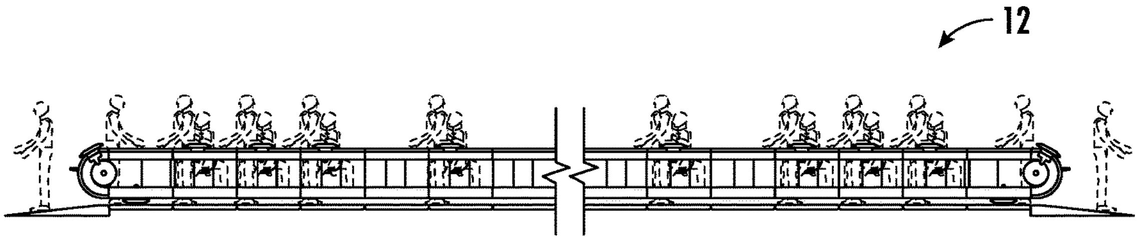
FIGS. 1A-1C are various views of one embodiment of a seat system constructed in accordance with the present disclosure.
Figure 1B:
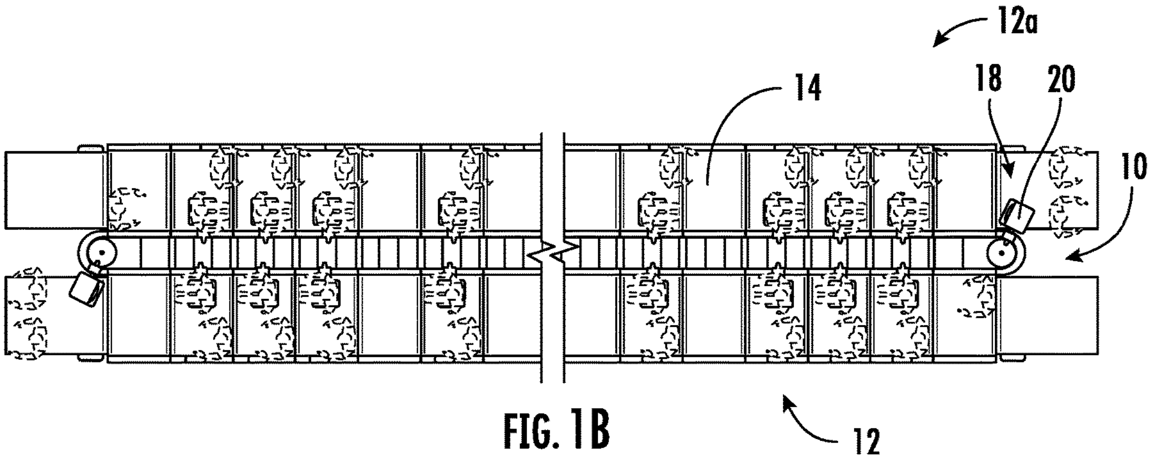
Figure 1C:
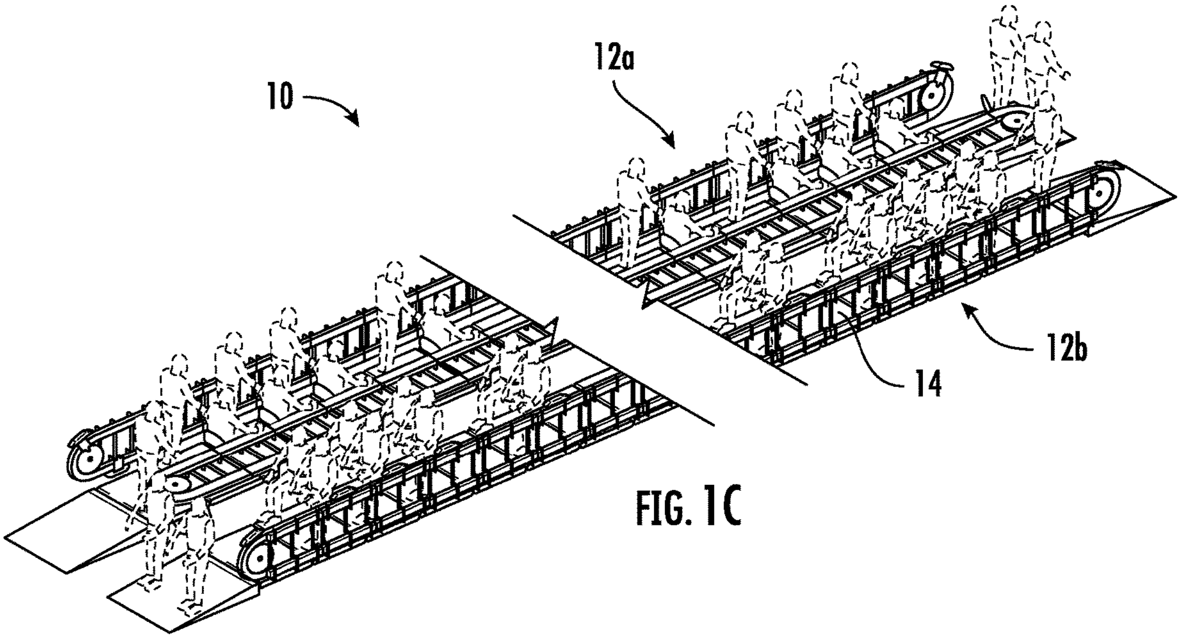

The present disclosure relates to seat systems 10 that can be used with a moving walkway 12 or a modular moving walkway 12*a*. The present disclosure is also directed to a method of installing, operating and monitoring the seat system 10 as described herein. The moving walkway 12 can be an accelerating walkway that includes a moving base treadway 14 that can be a belt-type, pallet-type or other accelerating treadway mechanism. The seat systems 10 can be designed to be synchronized with the speed of the moving base treadway 14, or to have substantially the same speed as the moving base treadway 14 of the moving walkway 12 or have substantially the same speed as each moving base treadway 14 of each module of a modular moving walkway 12*a*. The moving walkways seat systems 10 can be used with continuous, unibody moving walkways 12 or discrete, modular moving walkways 12*a* connected together to be practically continuous. The seat system 10 includes a seat apparatus 16, a propulsion system 18 for driving the seats 20 of the seat apparatuses 16 and a frame 22 for supporting the propulsion system 18 and the seat apparatuses 16.

Figure 2A:
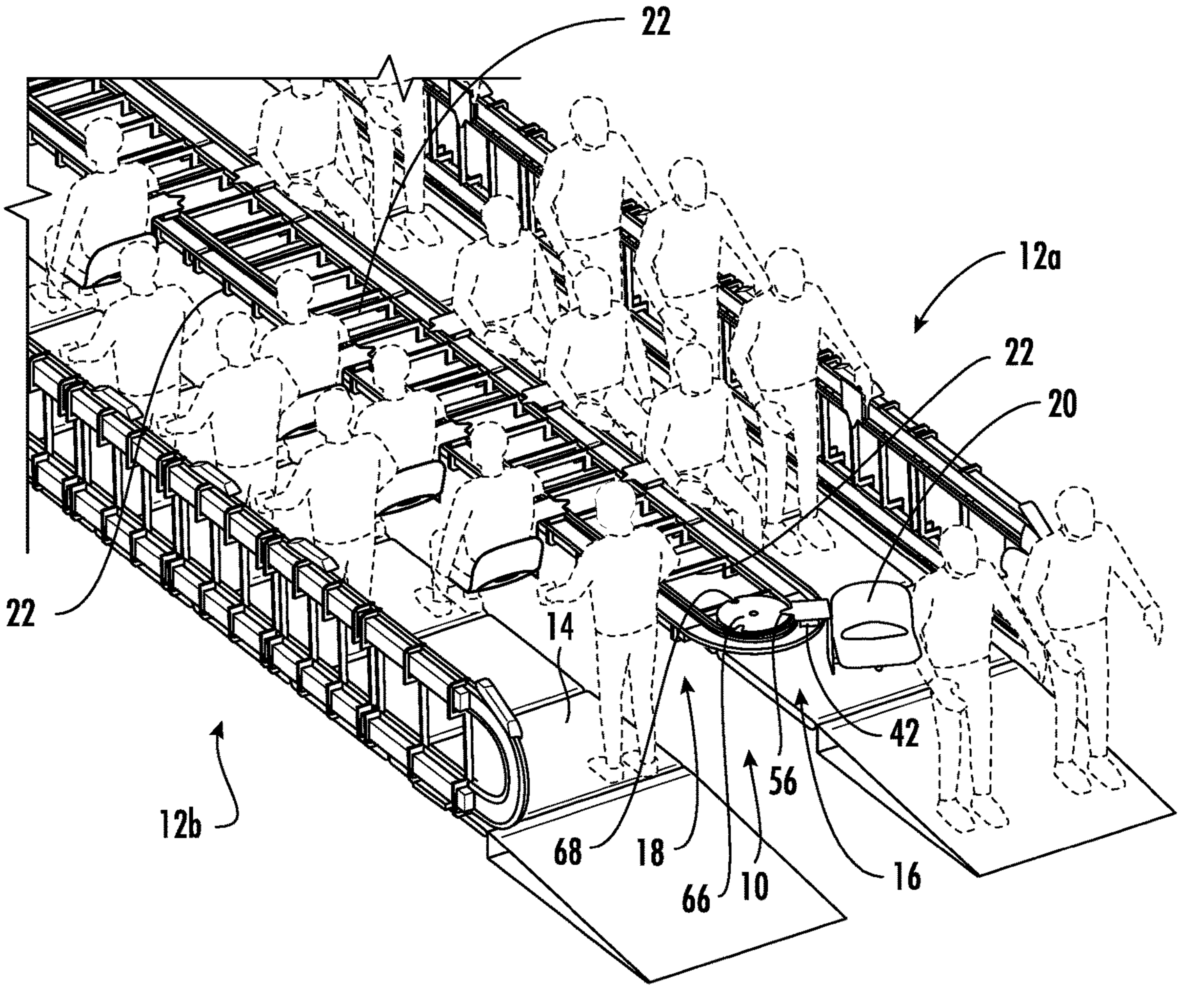
FIGS. 2A and 2B are perspective views of the seat system constructed in accordance with the present disclosure.
Figure 2B:
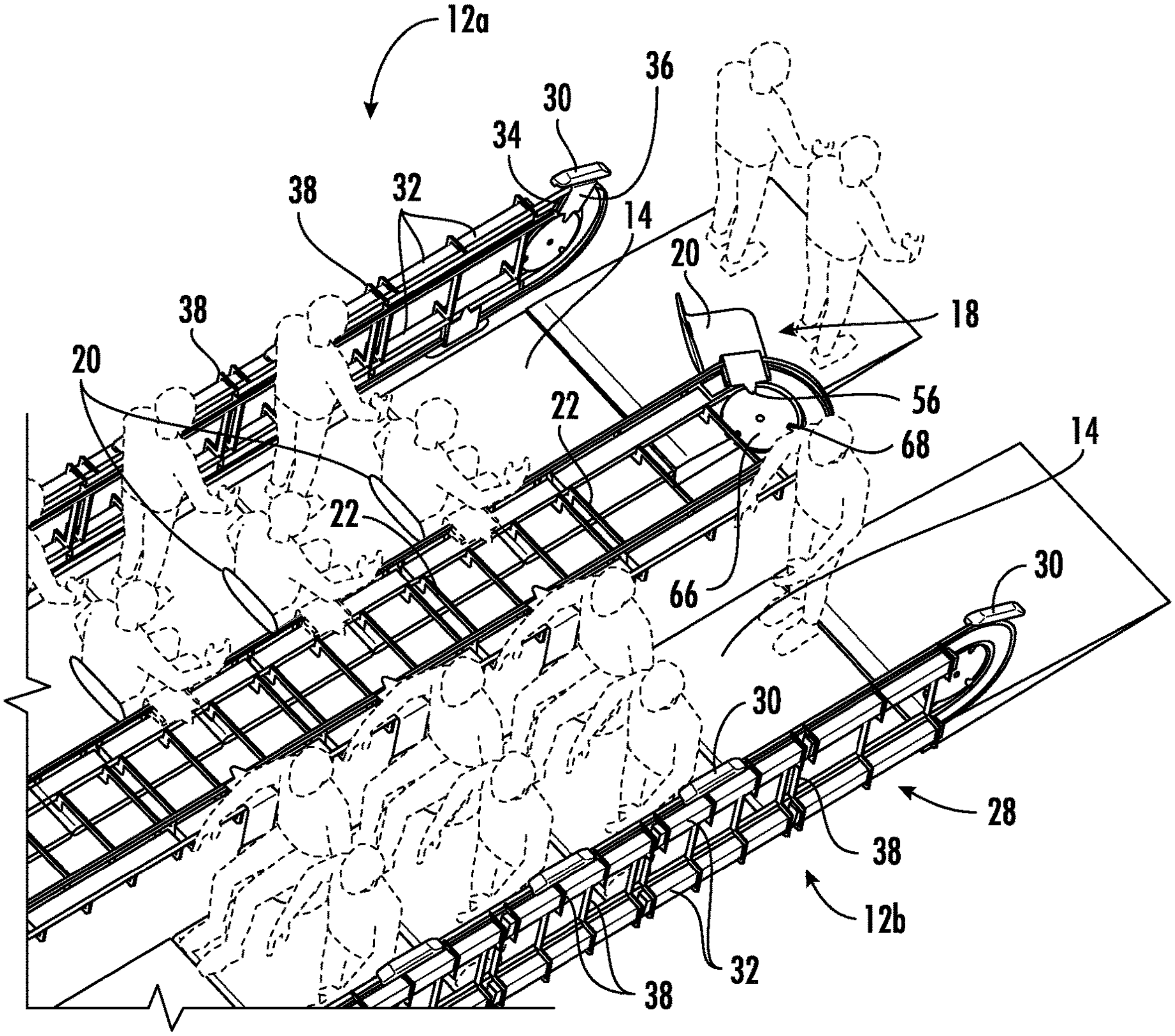
Figure 3A:
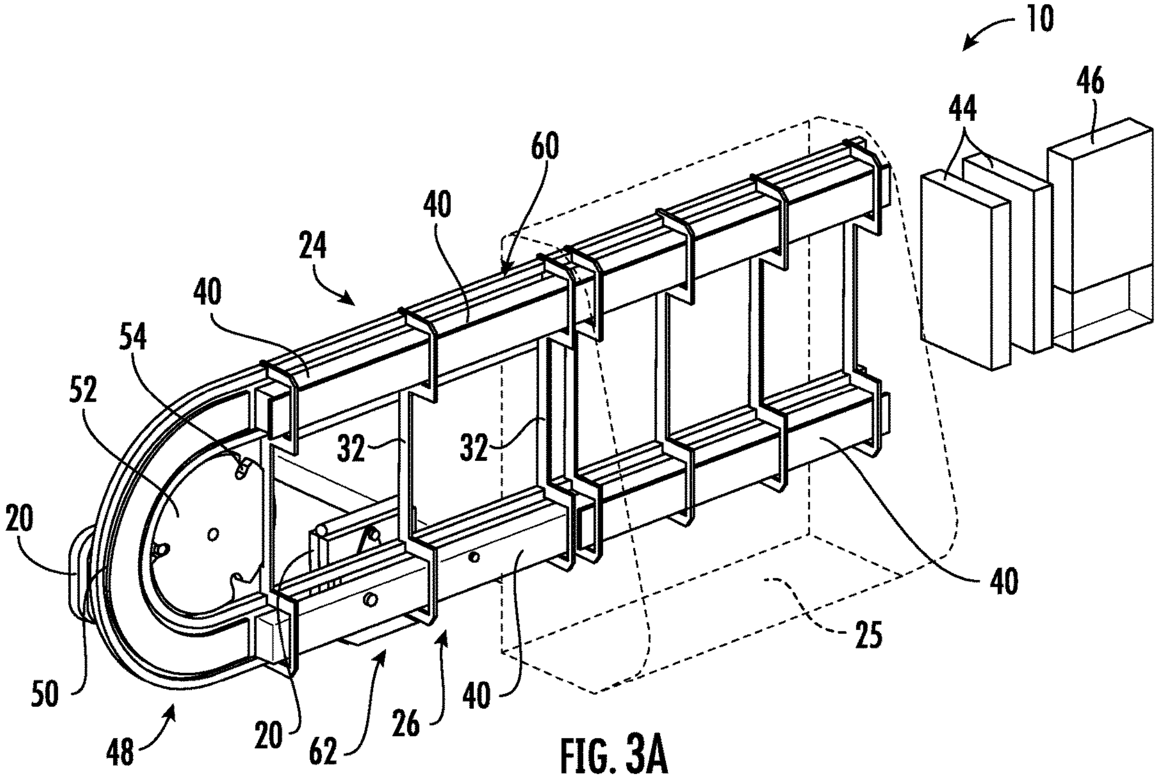
FIGS. 3A-3C show various views of the seat system constructed in accordance with the present disclosure.
Figure 3B:
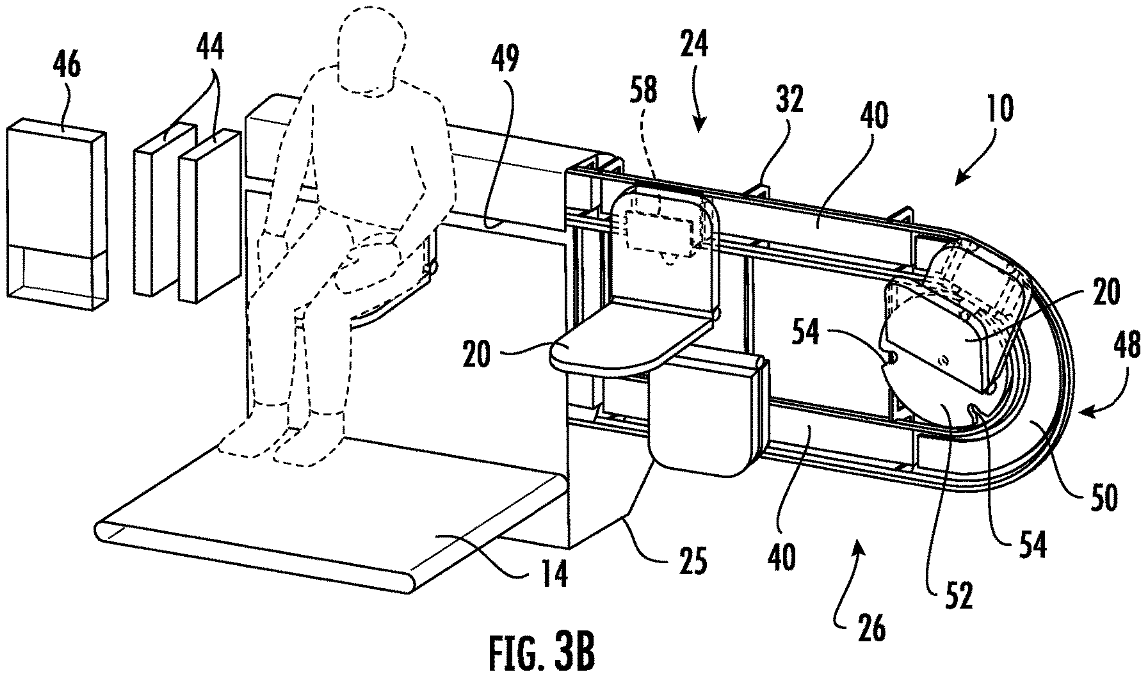
Figure 3C:
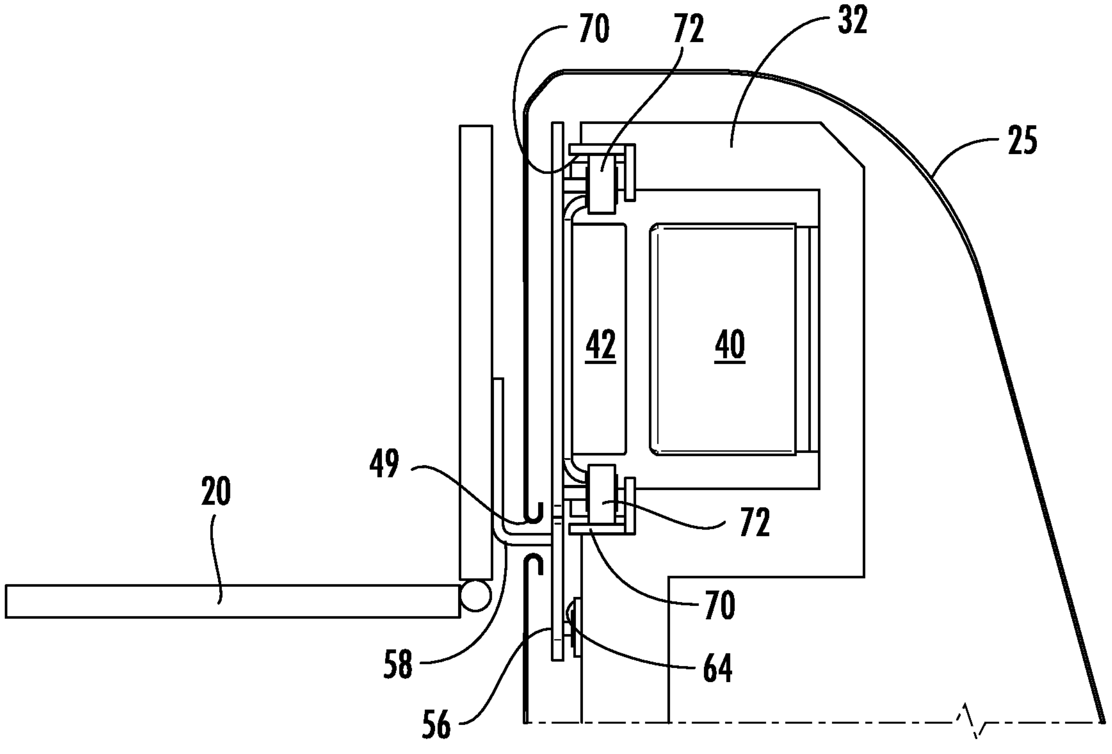

In one embodiment shown in FIGS. 2A and 2B, the seat system 10 for the moving walkway 12 can be set up wherein each seat apparatus 16 travels in a horizontal loop that is parallel to the ground. In this embodiment, the seat system 10 can provide seats to passengers for a first moving walkway 12*b* traveling in a particular direction on one side of the loop the seat system 10 travels on and can provide seats to passengers for a second moving walkway 12*c* traveling in the opposite direction of the first moving walkway 12*b* on the other side of the loop the seat system 10 travels on. In another embodiment of the present disclosure shown in more detail in FIGS. 3A-3C, the seat system 10 for the moving walkway 12 can be set up in a vertical loop seat system 10*a* perpendicular to the ground. In this orientation, the seats 20 are available for sitting on a passenger side 24 of the vertical loop seat system 10*a* and they travel in a side housing 25 when they are on a return side 26 of the vertical loop. It should be understood and appreciated that for this embodiment, each moving walkway 12, or each moving walkway module 12*a*, can include two seat systems 10 and two side housings. It should also be understood and appreciated that the seat system 10*a* described in this embodiment can be used on each side of the moving walkway 14. Therefore, there could be seats 20 on each side of the moving walkway 14 for passengers to sit while traveling on the moving walkway 14. In a further embodiment, the moving walkway 14 can have a seat system 10 described herein on one side of the moving walkway 14 and a handrail system 28 (shown in FIGS. 2A and 2B) like that described in U.S. Provisional Application No. 63/454,335 and U.S. patent application Ser. No. 18/615,419 (the '419 application) on the other side of the moving walkway. The handrail system 28 can include handgrasps 30 that are propelled by linear motors 32 that drive a magnet element 34 supported by the handgrasps 30. The handgrasps 30 can be mounted to a support member 36 that can be guided and run around a frame 38 that supports the linear motors 32. All elements of the seat systems 10/10*a* and the handrail system 28, except for the seats 20 and handgrasps 30 that are available for engagement with the passenger of the moving walkway 12, can be encased in housings that are not shown in some of the drawings.

The propulsion system 18 includes linear motors 40 that define at least a part of a path the seats 20 will travel and a permanent magnet 42 associated with the seat 20 of each seat apparatus 16. The number of linear motors 40 depends upon the setup of the moving walkway 12, or how many modules there are for a modular moving walkway 12*a*. Each module of a modular moving walkway 12*a* could have multiple linear motors 40 and the modules can be positioned such that the modular moving walkway 12*a* is practically continuous and movement of the seats 20 is smooth and continuous. The linear motor 40 and each permanent magnet 42 cooperate to propel each seat 20 around the path defined by the layout of the linear motors 40. Each linear motor 40 includes charged coils disposed therein. The linear motor 40 could also include embedded sensors (e.g., hall effect sensors). The linear motors 40 can be operated by motor drives 44, such as an inverter, which receives commands from a control system 46. The control system 46 includes any necessary computing hardware to accomplish the desired function of the seat systems 10. For example, the computer system 46 can include a controller (PLC), memory, graphical user interface (GUI), a communication interface, and any other hardware or software known to those of ordinary skill in the art. The control system 46 can be configured to set motion profiles for each seat 20 by communicating with the linear motor 40, or linear motors 40, included in the propulsion system. The control system 46 can coordinate electrical or electromagnetic impulses to each linear motor 40 along the path. The control system 46, via the impulses sent to the linear motor(s) 40, can modulate the speed of each seat 20 for acceleration, constant speed, deceleration, safety stops, and/or other movement patterns.

The seat system 10/10*a*, whether oriented as a vertical loop or horizontal loop, can also include transition zones 48. The transition zones 48 of the horizontal loop seat system 10 occur where the seats 20 transition from traveling a first direction to traveling a second direction and where the seats 20 transition from traveling the second direction back to the first direction. This transition area 48 could be covered or uncovered (i.e., included inside a housing. As stated above, the seats 20 in the vertical loop system 10*a* are disposed at least partially in the side housing after the seats 20 move from passenger side 24 of the vertical loop system 10*a* to the return side 26 of the vertical loop system 10*a* and from the return side 26 to the passenger side 24 of the vertical loop.

In the vertical loop seat system 10*a*, the side housing 25 can include a slot 49 wherein a part of the seat apparatuses 16 can pass therethrough so the only part of the seat apparatus 16 that are outside of the housing are the seats 20. The slot can be disposed anywhere in the side housing such that the passengers would have access to the seats 20 when they are traveling on the moving walkway 14. When a part of the seat apparatus 16 is passing through the slot in the side housing, the seat apparatus 16 is traveling on the passenger side 24 of the vertical loop. After the seat apparatus 16 transitions to the return side 26 of the loop, or during the transition, the seat apparatus 16 will be inside of the side housing and not visible to the passengers on the moving walkway 14.

Figure 4:
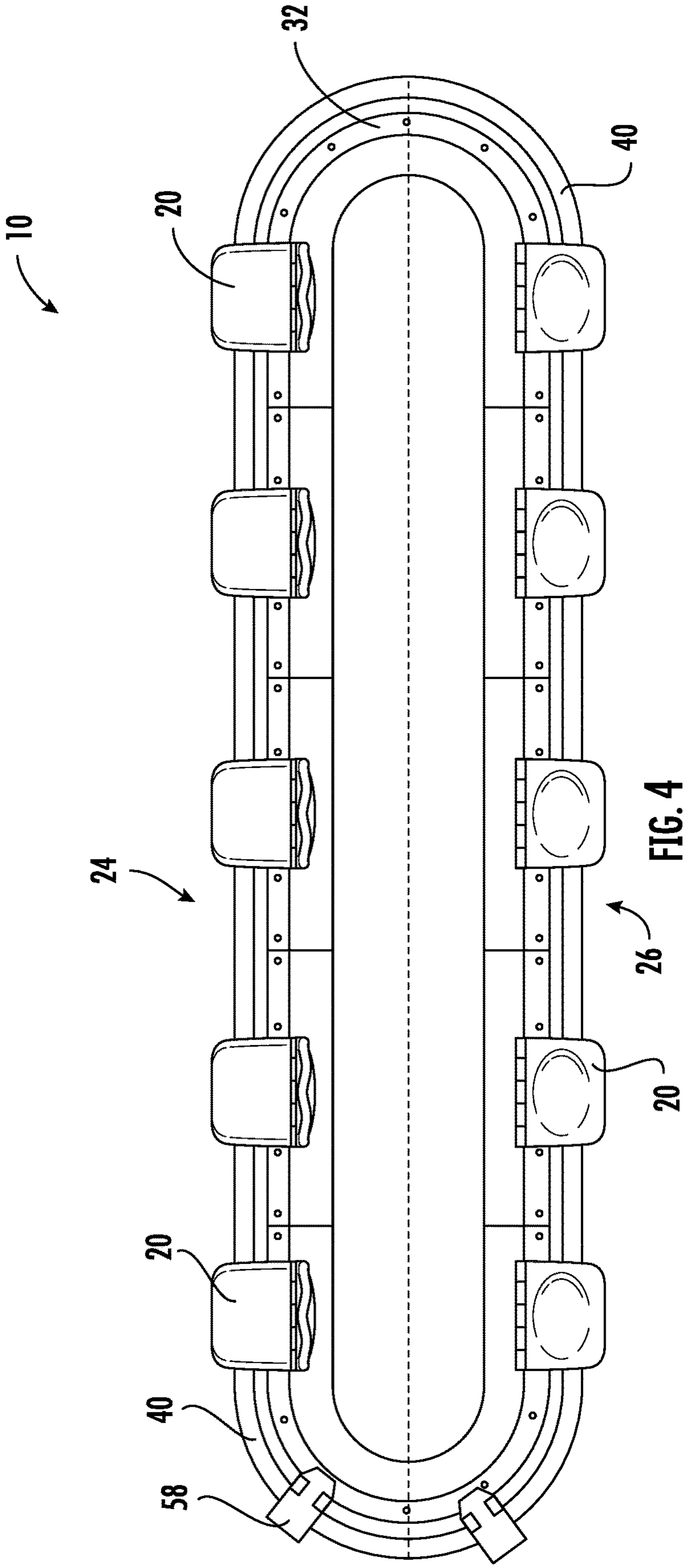
FIG. 4 is a side elevation view of another embodiments of the seat system constructed in accordance with the present disclosure.
Figure 5A:
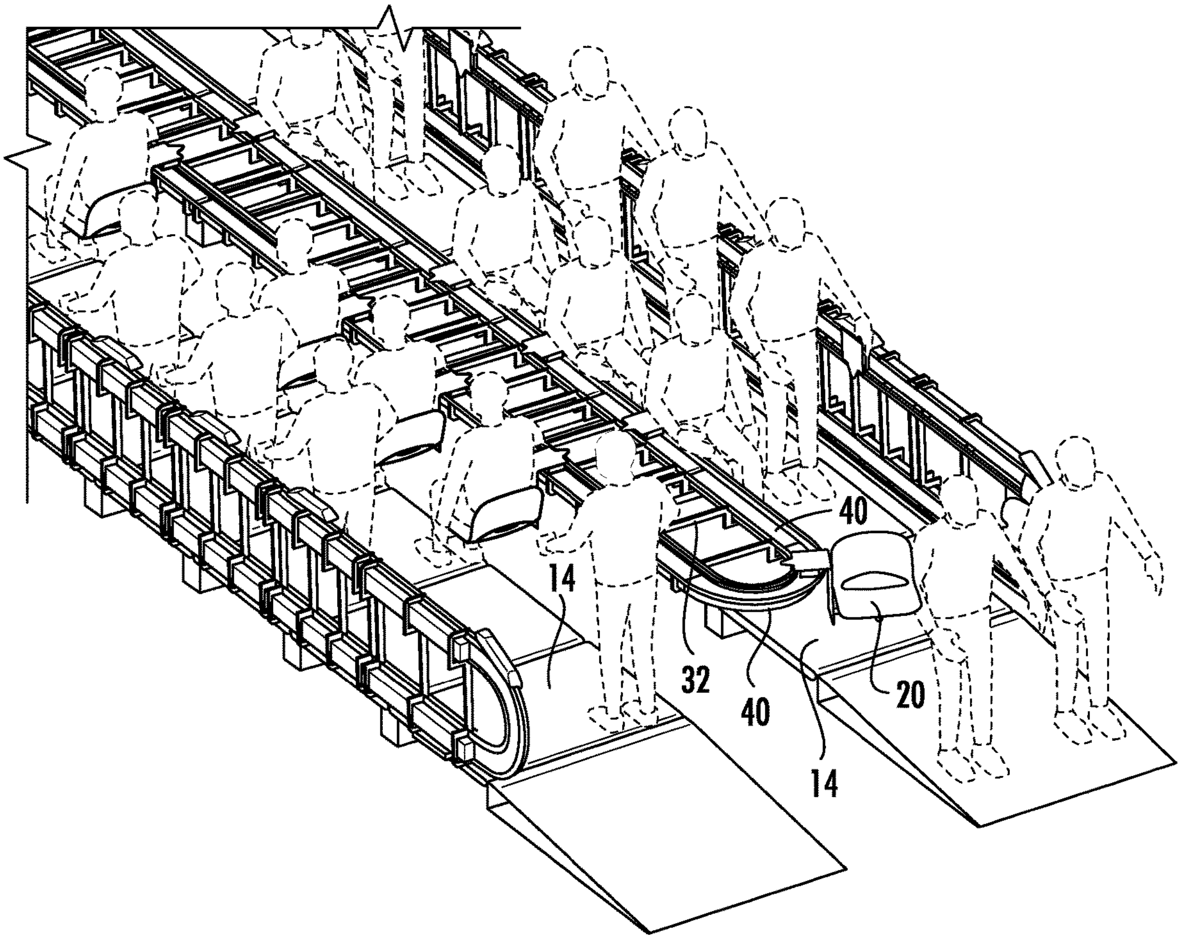
FIGS. 5A and 5B are perspective views of another embodiment of the seat system constructed in accordance with the present disclosure.
Figure 5B:
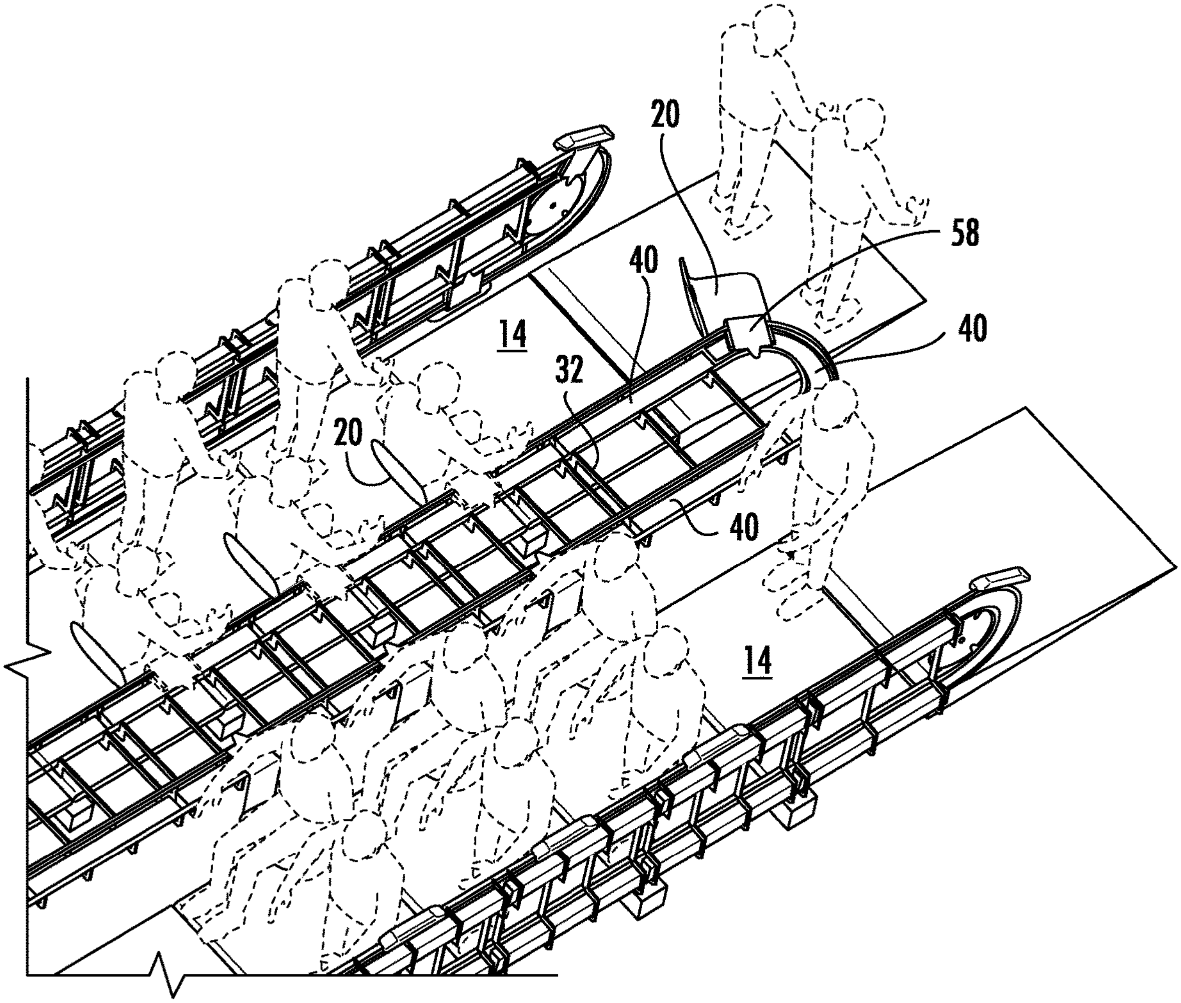

As shown in FIGS. 4, 5A and 5B, the transition areas 48 of the vertical loop seat system 10*a* or the horizontal loop seat system 10 can include a looping array of linear motors 40 around a curved track 50 (supported by the frame 22) to continue the magnetic propulsion of the seats 20 around the transition areas 48. In another embodiment shown in FIGS. 3A and 3B, the transition areas 48 for the vertical loop seat system 10*a* can include a vertically disposed rotary wheel 52 that includes notches 54 therein to engage a protruded portion 56 of a base member 58 of the seat apparatus 16. For the vertical loop system 10*a*, as the seat apparatus 16, driven by a linear motor 40, approaches the transition area 48 from a linear passenger track 60 supported by the frame 22 associated with the passenger side 24 (or the transition area 48 from the return side 26), the protruded portion 56 of the seat apparatus 16 engages a notch 54, or teeth, in the rotary wheel 52 and the rotary wheel 52 forces the seat apparatus 16 along the curved track 50 and into engagement with a linear return track 62 associated with the return side 26 (or the passenger track 60 if transitioning from the return side 26 to the passenger side 24). The seat apparatus 16 is propelled along the linear return track 62 by a linear motor 40. In a further embodiment the protruded portion 56 of the seat apparatus 16 can include a rotary element 64, such as a wheel, to more efficiently handle the rotational movement between the seat apparatus 16 and the rotary wheel 52. The size of the rotary wheel 52 and the number of notches 54 in the rotary wheel 52 are determined by the radius of the curved track 50 of the transition areas 48, the number/frequency of seat apparatuses 16 the particular seat system 10/10*a* has. Furthermore, the rotational speed of the rotary wheel 52 can be synchronized with the speed the seats 20 are propelled by the adjacent linear motors 40 (passenger linear motor and return linear motors).

Similarly, the transition areas 48 for the horizontal loop seat system 10 can include a horizontally disposed rotary wheel 66 that includes notches 68 therein to engage the protruded portion 58 of the base member 58 of the seat apparatus 16. In this embodiment, the horizontally oriented rotary wheel 66 can operate in substantially the same way as the vertically disposed rotary wheel 52 to deliver the seat apparatus 16 from the first direction of travel for the first moving walkway 12*b* to the second direction of travel for the second moving walkway 12*c*. A second rotatory wheel 66/transition area 48 can cause the seat apparatus 16 to go from the second direction of travel on the second moving walkway 12*c* back to the first direction of travel of the first moving walkway 12*b*. The rotary wheels 52/66 described herein, whether it be for the vertical or horizontal loop system 10*a*/10, can have as many notches 54/68 as desirable to accomplish the desired transition function. The notches 68 can be shaped to accommodate clockwise or counterclockwise rotation. This would permit the seat systems 10/10*a* to operate bidirectionally. The notches 54/68 could be shaped such that each notch 54/68 can accommodate bidirectional movement of the seat system. The wheel 52/66 could be completely toothed (geared) for engagement with the seat apparatuses 16.

The frame 22 of the seat system 10 can be supported inside the side housing 25 in any manner known in the art and can be supported by any part of the side housing. The frame 22 is designed for the linear motors 40 of the seat system 10 to be mounted in a position such that the permanent magnet 42 of the seat apparatus 16 is positioned adjacent to the base member 58 of the seat apparatus 16 to provide the propulsion of the seat apparatus 16. The frame 22 also provides the linear return track 62 and the linear passenger track 60 that guides the seat apparatuses 16. Each of the linear return track 62 and the linear passenger track 60 can be defined by multiple shoulders 70 that can engage with wheels 72 supported by the seat apparatus 16. The wheels 72 engage the shoulders 70 and prevent the seat apparatus 16 from moving upward, downwards or towards the linear motors 40.

In another embodiment of the present disclosure, the seats 20 can be propelled along the return side 26 of the vertical loop seat system 10*a* via belt conveyors. The belt conveyors in this embodiment can be a flat or grooved belt that frictionally engages a part or parts of the seat apparatuses 16 to move the seat apparatuses 16 along the return side 26. The belt conveyors can also be metal belts that magnetically propel the magnet arrays 42 comprised in the seat apparatus 16. The belt conveyor for this embodiment can be similar to the belt conveyor described in '419 application. Therefore, the seat apparatus 16 could be propelled by the belt conveyor in the same manner the handgrasp apparatuses are in the '419 application. The belt conveyor can be propelled by a motor used to turn a gear the belt conveyor is engaged with.

The seat apparatus 16 can include the base member 58 for supporting the seat 20 and the permanent magnet 42 that is magnetically propelled by the linear motor(s) 40. The base member 58 could also support the protruded portion 56 of the seat apparatus 16 described above. The seats 20 of each seat apparatus 16 can be oriented in any position desirable. For example, the seats 20 could be mounted to the base member 58 such that each seat 20 faces the direction the moving walkway 14 travels or each seat 20 could face inward (or toward the center of the moving walkway 14 and perpendicular to the direction of travel of the moving walkway 14). In a further embodiment when the seat system 10*a* is oriented in the vertical orientation, the seat 20 can be collapsible so that the seat 20 can more easily travel on the return side 26 in the side housing 25.

Figure 6A:
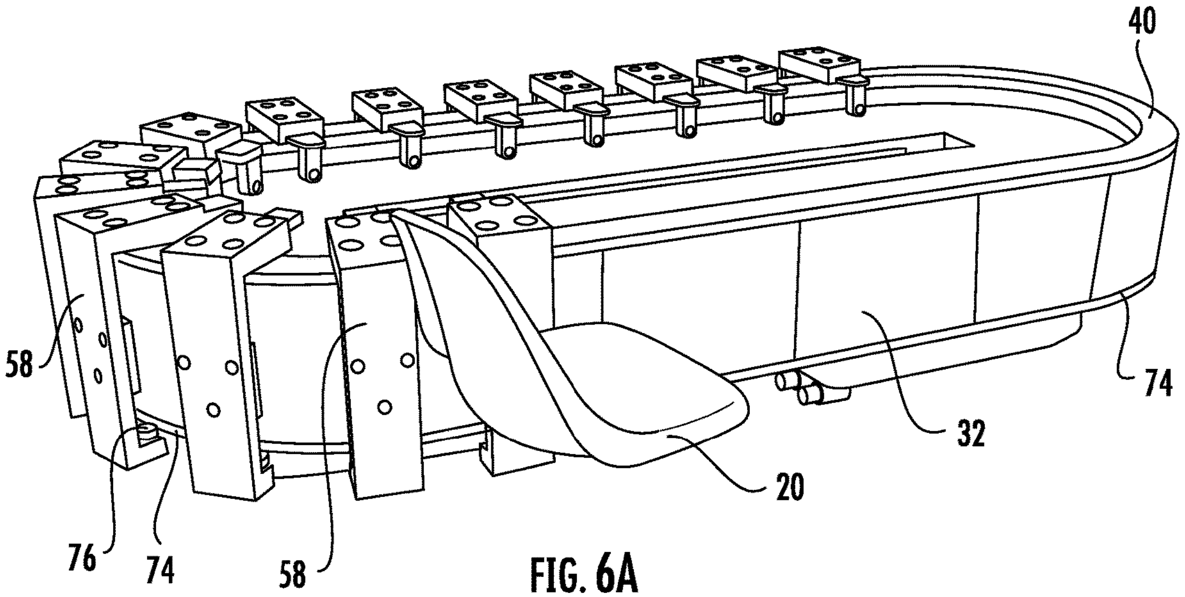
FIGS. 6A-6B provide perspective views of additional embodiment of the seat system constructed in accordance with the present disclosure.
Figure 6B:
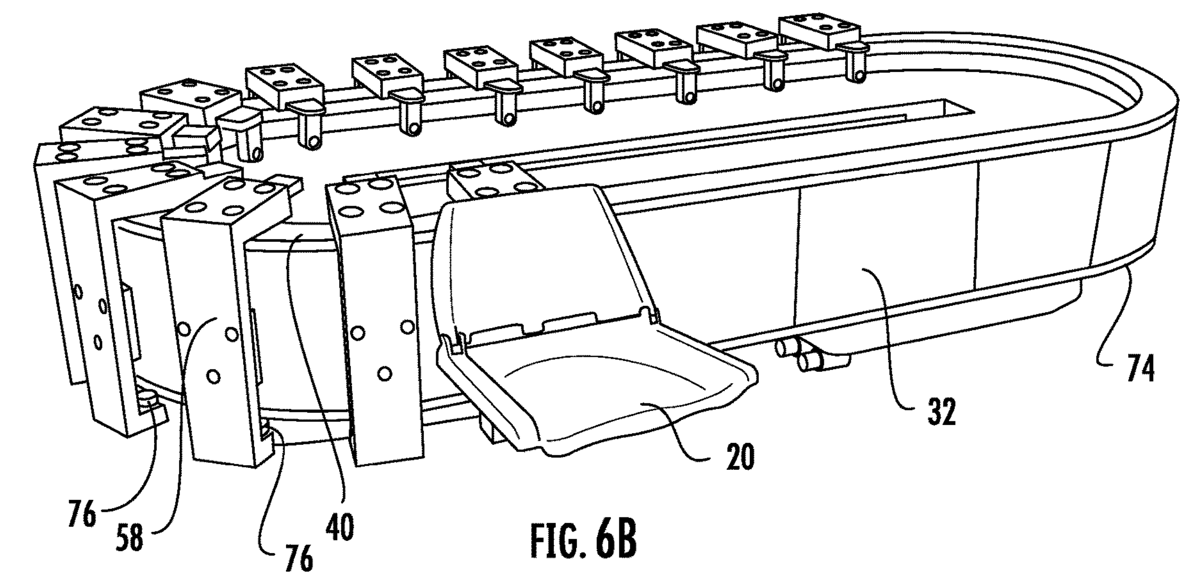

In yet another embodiment of the present disclosure shown in FIGS. 6A and 6B, when the seat system 10 is in the horizontal orientation, the propulsion system 18 can include a second track 74 created by additional linear motors 40 to move a second permanent magnet 76 attached to the base member 58 of the seat apparatus 16. The two linear motor tracks 40 and 74 and two permanent magnets 42 and 76 can potentially provide for more efficient movement of the seat apparatuses 16.

Similar to that described for the handrail system in the '419 application, the propulsion of the seats 20 can be accomplished with a permanent magnet attached to the seat apparatus 16 and positioned adjacent to a linear motor 40. In another embodiment, the magnetic propulsion could be accomplished using aluminum extrusion or other magnetically propelled material. In yet another embodiment, the magnetic propulsion of the seats 20 can be accomplished by using a linear motor attached to the seat apparatuses 16 and using a permanent magnet, aluminum extrusion or other magnetically propelled material that is stationary and supported by the frame 22 of the seat system 16. The propulsion system for this embodiment can be similar to the propulsion system described in '419 application in that the handgrasp apparatus in the '419 application can be replaced with the seat apparatus 16 disclosed herein.

When the seat systems 10/10*a* are used with a modular moving walkway 12*a*, several modules at the beginning and end of the modular moving walkway 12*a* can be operated at a constant speed to facilitate a passenger being able to safely transition from a seated position to a standing position. Similarly, this constant speed of the modules of the modular moving walkway 12*a* can also facilitate a passenger transitioning from a standing position to a seated position.

Figure 7:
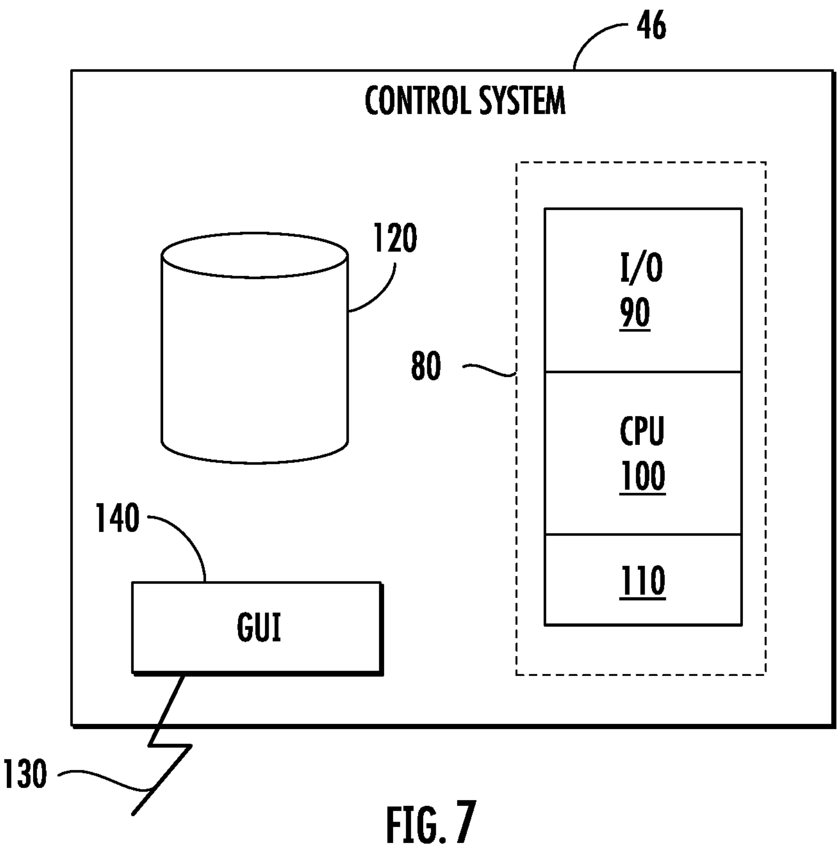
FIG. 7 schematic view of a control system for the seat system constructed in accordance with the present disclosure.

Referring now to FIG. 7 shown therein is a diagram of the control system 46. The control system 46 is capable of executing a computer program product embodied in a tangible processor-readable storage medium to execute a computer process. Data and program files may be input into the control system 46, which reads the files and executes the programs therein using one or more processors. Some of the elements of the control system 46 are shown in FIG. 7, wherein a processor 80 is shown having an input/output (I/O) section 90, a Central Processing Unit (CPU) 100, and a memory section 110. There may be one or more processors 800, such that the processor 80 of the control system 46 comprises a single central-processing unit 100, or a plurality of processing units. The processors may be single-core or multi-core processors. The control system 46 may be a conventional computer, a distributed computer, or any other type of computer. The described technology is optionally implemented in software loaded in memory 110, a disc storage unit 120, and/or communicated via a wired or wireless network link 130 on a carrier signal (e.g., Ethernet, 3G wireless, 1G wireless, LTE (Long Term Evolution), 5G) thereby transforming the control system 46 in FIG. 7 to a special purpose machine for implementing the described operations.

The I/O section 90 may be connected to one or more user-interface devices (e.g., a keyboard, a touch-screen display unit, etc.) or a disc storage unit 120. Computer program products containing mechanisms to effectuate the systems and methods in accordance with the described technology may reside in the memory section 110 or on the storage unit 120 of the control system 46.

The control system 46 can also include a communication interface 140 capable of connecting the control system 46 to an enterprise network via the network link 130, through which the control system 46 can receive instructions and data embodied in a carrier wave. When used in a local area networking (LAN) environment, the control system 46 is connected (by wired connection or wirelessly) to a local network through the communication interface 140, which is one type of communications device. When used in a wide-area-networking (WAN) environment, the control system 46 typically includes a modem, a network adapter, or any other type of communications device for establishing communications over the wide-area network. In a networked environment, program modules depicted relative to the control system 46 or portions thereof may be stored in a remote memory storage device. It is appreciated that the network connections shown are examples of communications devices for and other means of establishing a communications link between the computers may be used.

In an example implementation, a browser application, a compatibility engine applying one or more compatibility criteria, and other modules or programs may be embodied by instructions stored in memory 110 and/or the storage unit 120 and executed by the processor 80. Further, local computing systems, remote data sources and/or services, and other associated logic represent firmware, hardware, and/or software, which may be configured to operate the seat system 10/10*a*, and the moving walkway 12 the seat system 10/10*a* is implemented into. The control system 46 of the seat system 10/10*a* may be implemented using a general purpose computer and specialized software (such as a server executing service software), a special purpose computing system and specialized software (such as a mobile device or network appliance executing service software), or other computing configurations. In addition, user requests, profiles and parameter data, agent profiles and parameter data, location data, parameter matching data, and other data may be stored in the memory 110 and/or the storage unit 120 and executed by the processor 80.

The embodiments of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" (e.g., memory 110) means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" or "storage medium" expressly does not include a transitory medium, such as a carrier signal, but the computer instructions can be transferred to the memory wirelessly.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A seat system for a moving walkway, the seat system comprising:

multiple seat apparatuses for a moving walkway, each seat apparatus includes a seat;

a propulsion system for propelling the seat apparatuses on a passenger side and a return side of a loop track the seat apparatuses travel around, the propulsion system includes linear motors along the passenger side or the return side that interact with a magnet supported by each seat apparatus to propel the seat apparatuses around the loop track; and a frame for supporting the seat system and enclosing the return side for the seats.

2. The system of claim 1 further comprising a frame that defines the loop track the seat apparatuses will travel around.

3. The system of claim 1 further comprising a computer system to set motion profiles and modulate speed of the seats by sending electrical signals to the linear motors of the propulsion system.

4. The system of claim 2 wherein the frame has a series of shoulders that can be engaged by a series of wheels mounted to the seat apparatus to maintain position of the seat apparatuses as they travel around the loop track.

5. The system of claim 1 wherein each module of the moving walkway includes a separate linear motor for each return side of the loop track.

6. The system of claim 1 wherein the loop track is horizontally disposed and the passenger side of the loop track provides seats to passengers going a first direction on a first moving walkway and the return side of the loop track provides seats to passengers going a second direction on a second moving walkway, the horizontally disposed loop track includes transition zones to allow the seat apparatuses to move from the first moving walkway to the second moving walkway and from the second moving walkway to the first moving walkway.

7. The system of claim 6 wherein each transition zone includes a rotary wheel that interacts with a portion of each seat apparatus to facilitate movement of the seat apparatuses from the linearly disposed passenger side to the linearly disposed return side and from the linear disposed return side to the linearly disposed passenger side.

8. The system of claim 7 wherein the rotary wheel includes notches disposed therein that engage with a protruded portion that extends from a base member of each seat apparatus.

9. The system of claim 6 wherein each transition zone includes a curved linear motor to propel the seat apparatuses around the transition zone.

10. The system of claim 1 wherein the seat apparatuses of the seat system are propelled around the horizontal loop track via a first linear motor.

11. The system of claim 10 wherein the seat apparatuses of the seat system are propelled around the horizontal loop track via a second linear motor.

12. The system of claim 1 wherein the moving walkway includes a handrail system to provide handgrasps to passengers on an opposite side of the moving walkway from the seat system and the corresponding seats.

13. The system of claim 1 wherein the speed of each seat is substantially the same speed as a speed of a section of a treadway of the moving walkway closest to each seat.

14. A seat system for a moving walkway, the seat system comprising:

multiple seat apparatuses for a moving walkway, each seat apparatus includes a seat;

a propulsion system for propelling the seat apparatuses on a passenger side and a return side of a loop track the seat apparatuses travel around, the propulsion system includes a linear motor attached to each seat apparatus that interacts with magnets that are supported by a frame to propel the seat apparatuses around at least a portion of the loop track; and a frame for supporting the seat system and enclosing the return side for the seats.

15. The system of claim 14 further comprising a frame that defines the loop track the seat apparatuses will travel around.

16. The system of claim 14 further comprising a computer system to set motion profiles and modulate speed of the seats by sending electrical signals to the linear motors of the propulsion system.

17. The system of claim 14 wherein the moving walkway includes a handrail system to provide handgrasps to passengers on an opposite side of the moving walkway from the seat system and the corresponding seats.

18. The system of claim 14 wherein the propulsion system includes a belt conveyor to propel the seat apparatuses along the return side of the loop track.

19. The system of claim 14 wherein the speed of each seat is substantially the same speed as a speed of a section of a treadway of the moving walkway closest to each seat.

20. A seat system for a moving walkway, the seat system comprising:

multiple seat apparatuses for a moving walkway, each seat apparatus includes a seat;

a propulsion system for propelling the seat apparatuses on a passenger side and a return side of a loop track the seat apparatuses travel around;

a frame for supporting the seat system and enclosing the return side for the seats; and wherein the moving walkway is a modular moving walkway wherein each module of the moving walkway includes a separate linear motor for each passenger side of the loop track, or wherein the loop track is horizontally disposed and the passenger side of the loop track provides seats to passengers going a first direction on a first moving walkway and the return side of the loop track provides seats to passengers going a second direction on a second moving walkway, or wherein the seat of the seat apparatuses are folded up for the return side, or wherein the seats can be oriented to face the direction the moving walkway is traveling or perpendicular to the direction the moving walkway is traveling, or wherein the moving walkway includes two seat systems to provide seats to passengers on both sides of the moving walkway moving in a same direction, or wherein the loop track includes transition zones to allow the seat apparatuses to move from the linearly disposed passenger side to the linearly disposed return side and from the linear disposed return side to the linearly disposed passenger side, each transition zone includes a rotary wheel that interacts with a portion of each seat apparatus to facilitate movement of the seat apparatuses from the linearly disposed passenger side to the linearly disposed return side and from the linear disposed return side to the linearly disposed passenger side, or wherein the loop track includes transition zones to allow the seat apparatuses to move from the linearly disposed passenger side to the linearly disposed return side and from the linear disposed return side to the linearly disposed passenger side, each transition zone includes a curved linear motor to propel the seat apparatuses around the transition zone.

21. The system of claim 1 further comprising a frame that defines the loop track the seat apparatuses will travel around.

22. The system of claim 20 wherein the rotary wheel includes notches disposed therein that engage with a protruded portion that extends from a base member of each seat apparatus.

23. The system of claim 20 wherein the horizontally disposed loop track includes transition zones to allow the seat apparatuses to move from the first moving walkway to the second moving walkway and from the second moving walkway to the first moving walkway.

24. The system of claim 23 wherein each transition zone includes a rotary wheel that interacts with a portion of each seat apparatus to facilitate movement of the seat apparatuses from the linearly disposed passenger side to the linearly disposed return side and from the linear disposed return side to the linearly disposed passenger side.

25. The system of claim 24 wherein the rotary wheel includes notches disposed therein that engage with a protruded portion that extends from a base member of each seat apparatus.

26. The system of claim 23 wherein each transition zone includes a curved linear motor to propel the seat apparatuses around the transition zone.

27. The system of claim 20 wherein the propulsion system includes a belt conveyor to propel the seat apparatuses along the return side of the loop track.

28. The system of claim 20 wherein the speed of each seat is substantially the same speed as a speed of a section of a treadway of the moving walkway closest to each seat.

* * * * *